United States Patent [19]
Kobayashi

[11] Patent Number: 6,055,248
[45] Date of Patent: Apr. 25, 2000

[54] TRANSMISSION FRAME FORMAT CONVERTER CIRCUIT

[75] Inventor: Eiichi Kobayashi, Tokyo, Japan

[73] Assignee: NEC Corporation, Tokyo, Japan

[21] Appl. No.: 08/958,399

[22] Filed: Oct. 29, 1997

[30] Foreign Application Priority Data

Oct. 29, 1996 [JP] Japan ..................................... 8-286816

[51] Int. Cl.[7] ................................. H04J 3/06; H04J 3/00
[52] U.S. Cl. .......................................... 370/517; 370/521
[58] Field of Search ..................................... 370/505, 506, 370/516, 517, 521, 465, 375, 378, 379, 466, 477, 508; 375/371, 372

[56] References Cited

U.S. PATENT DOCUMENTS

| | | | |
|---|---|---|---|
| 5,134,702 | 7/1992 | Charych et al. | 395/500 |
| 5,146,477 | 9/1992 | Cantoni et al. | 375/118 |
| 5,325,179 | 6/1994 | Azar et al. | 348/443 |
| 5,351,238 | 9/1994 | Ashi et al. | 370/516 |
| 5,359,605 | 10/1994 | Urbansky et al. | 370/517 |
| 5,420,894 | 5/1995 | Boslough et al. | 370/516 |
| 5,452,235 | 9/1995 | Isani | 364/514 |
| 5,471,510 | 11/1995 | Renault et al. | 370/517 |
| 5,822,327 | 6/1996 | Satou | 370/505 |

FOREIGN PATENT DOCUMENTS

| | | |
|---|---|---|
| 0 524 715 | 1/1993 | European Pat. Off. . |
| 63-287143 | 11/1988 | Japan . |
| 2-104152 | 4/1990 | Japan . |
| 3-196740 | 8/1991 | Japan . |
| 4-331528 | 11/1992 | Japan . |
| 6-284116 | 10/1994 | Japan . |
| 2 203 616 | 10/1988 | United Kingdom . |

*Primary Examiner*—Chau Nguyen
*Assistant Examiner*—Phuongchau Ba Nguyen
*Attorney, Agent, or Firm*—Foley & Lardner

[57] ABSTRACT

Disclosed is a transmission frame format converter circuit with a first-in-first-out(FIFO) memory where the inputting and outputting of a data signal are conducted at different clock rates, which has: a write control circuit which writes write-in data and a frame pulse which is extracted from a transmission line and indicates a head position of the write-in data in the FIFO memory; and a read control circuit which judges that read-out data are valid only when the frame pulse to be read out from the read control circuit is active and then reads out the read-out data from the FIFO memory, and which judges that the read-out data are invalid and then conducts the resetting of the write control circuit and the FIFO memory.

8 Claims, 4 Drawing Sheets

TRANSMISSION FRAME FORMAT CONVERTER CIRCUIT

FIELD OF THE INVENTION

This invention relates to a transmission frame format converter circuit with a first-in-first-out(FIFO) memory, and more particularly to, a transmission frame format converter circuit where the in putting and outputting of a data signal are conducted at different clock rates.

BACKGROUND OF THE INVENTION

An example of a conventional transmission frame format converter circuit with a FIFO memory is shown in FIG. 1.

As shown in FIG. 1, the data-writing side of FIFO 110 in the transmission frame format converter circuit comprises a serial-to-parallel(S/P) converter 101, a N-divided frequency generator 108. a writing counter 102, and a writing clock generator 108.

The S/P converter 101 converts write-in data which is input in the form of serial data 103 into parallel data 106, according to a divided frequency clock, which is explained later, to be output from the writing counter 102, and then outputs it to FIFO 110. The N-divided frequency generator 121, to which an extraction clock 105 from a transmission line is input, outputs a N-divided clock 120.

The writing counter 102, to which a frame pulse 104 and the N-divided frequency clock 120 from the N-divided frequency generator 121 are input, outputs a write-side divided frequency clock 107. The divided frequency clock 107 output from the writing counter 102 is supplied to the S/P converter 101 and the writing clock generator 108. The writing clock generator 108, to which the divided frequency clock 107 is input, outputs a write clock 109 for writing in FIFO 110.

The parallel data 106 which are converted by and output from the S/P converter 101 are written in FIFO 110 according to the writing clock 109 output from the writing clock generator 108.

The data-reading side of FIFO 110 in the transmission frame format converter circuit comprises a M-divided frequency generator 122, a reading counter 116, a reading clock generator 114, and a parallel-to-serial(P/S) converter 115.

The M-divided frequency generator 122, to which the extraction clock 105 from the transmission line is input, outputs a M-divided frequency clock 119, where M is not the same value as N and satisfies the relation of M>N or M<N. The reading counter 116, to which the M-divided frequency clock 119 and a framepulse 118 are input, outputs a read-side divided frequency clock 113, which is supplied to the reading clock generator 114 and the P/S converter 115. The reading clock generator 114 outputs a read clock 111 for reading data from FIFO 110 according to the divided frequency clock 113 to be input.

Data to be read out from FIFO 110 according to the read clock 111 are converted into serial data 117, which are output as read-out data.

However, in the conventional transmission frame format converter circuit, the read clock forces data to be read out regardless of the state that the data is not yet written in FIFO since the writing and reading operations are conducted independently of each other. Thus, data to be forcibly read out from FIFO must be acknowledged as effective data and transmitted even if the data are meaningless or useless.

SUMMARY OF THE INVENTION

Accordingly, it is an object of the invention to provide a transmission frame format converter circuit where the writing of unnecessary data can be canceled and only valid data are read out even when invalid data are written in so as to efficiently conduct the data transmission.

According to the invention, a transmission frame format converter circuit with a first-in-first-out(FIFO) memory where the inputting and outputting of a data signal are conducted at different clock rates, comprises:

a write control means which writes write-in data and a frame pulse which is extracted from a transmission line and indicates a head position of the write-in data in the FIFO memory; and a read control means which judges that read-out data are valid only when the frame pulse to be read out from the read control means is active and then reads out the read-out data from the FIFO memory, and which judges that the read-out data are invalid and then conducts the resetting of the write control means and the FIFO memory.

In this invention, on the write side of the FIFO memory, a write clock for writing in the FIFO memory is generated. The write clock is generated only when a frame pulse from the transmission line is active, so as to write only valid data in the FIFO memory. At this time, a frame pulse indicating the head position of valid data is also written therein.

On the other hand, on the read side of the FIFO memory, a read clock for reading data from the FIFO memory is generated. The read clock is generated only when a frame pulse from the FIFO memory is active, therefore data from the FIFO memory are not read out until an active frame pulse appears. When a frame pulse read out from the FIFO memory by a constant period read clock is active, data are in due order read out according to the read clock. If not active, the data are judged to be invalid and cleared by resetting.

BRIEF DESCRIPTION OF THE DRAWINGS

The invention will be explained in more detail in conjunction with the appended drawings, wherein.

BRIEF DESCRIPTION OF THE PREFERRED EMBODIMENTS

A transmission frame format converter circuit in the preferred embodiment will be explained in FIGS. 2 to 4.

Figure 1:
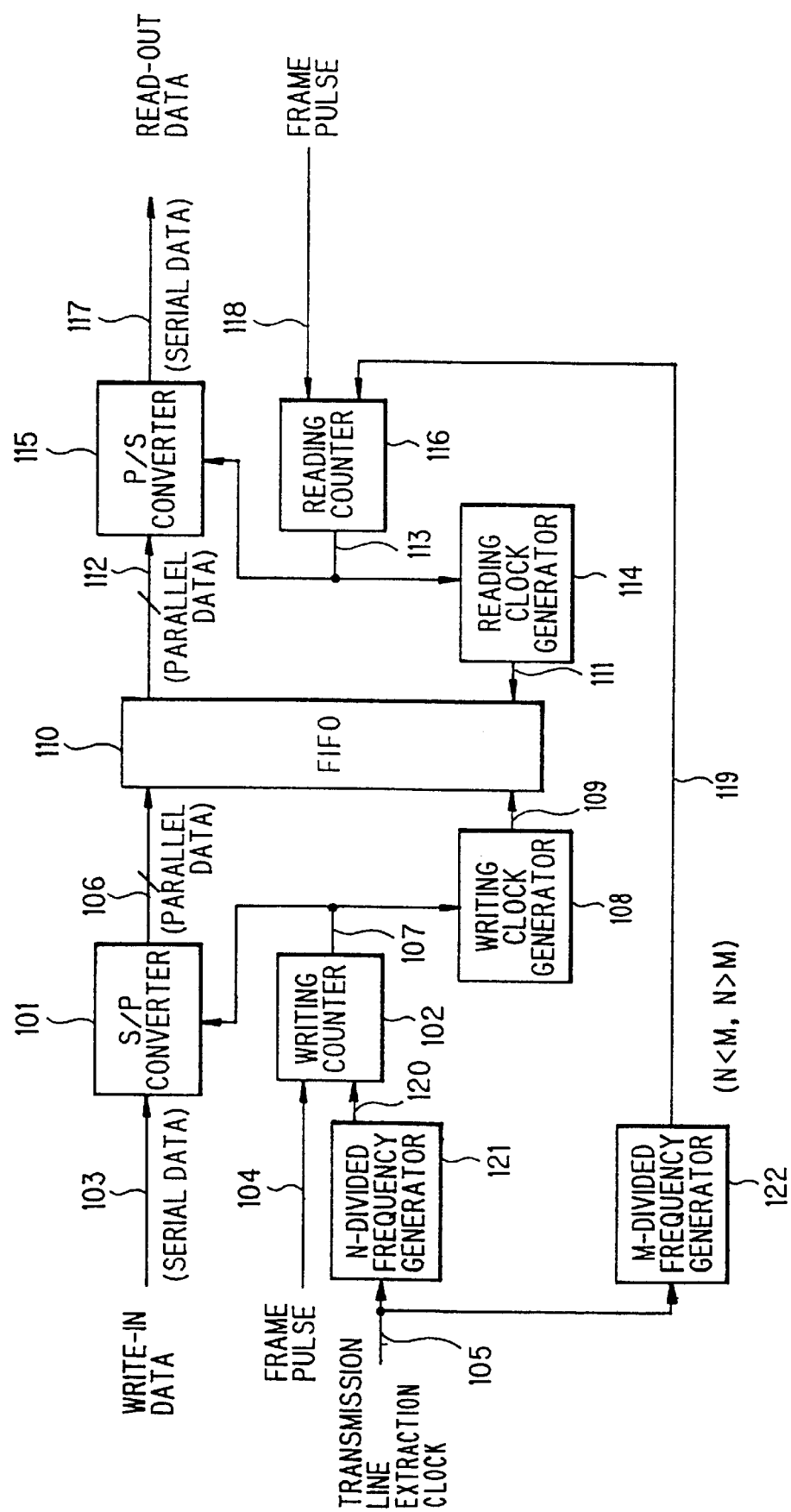
FIG. 1 is a block diagram showing a conventional transmission frame format converter circuit.
Figure 2:
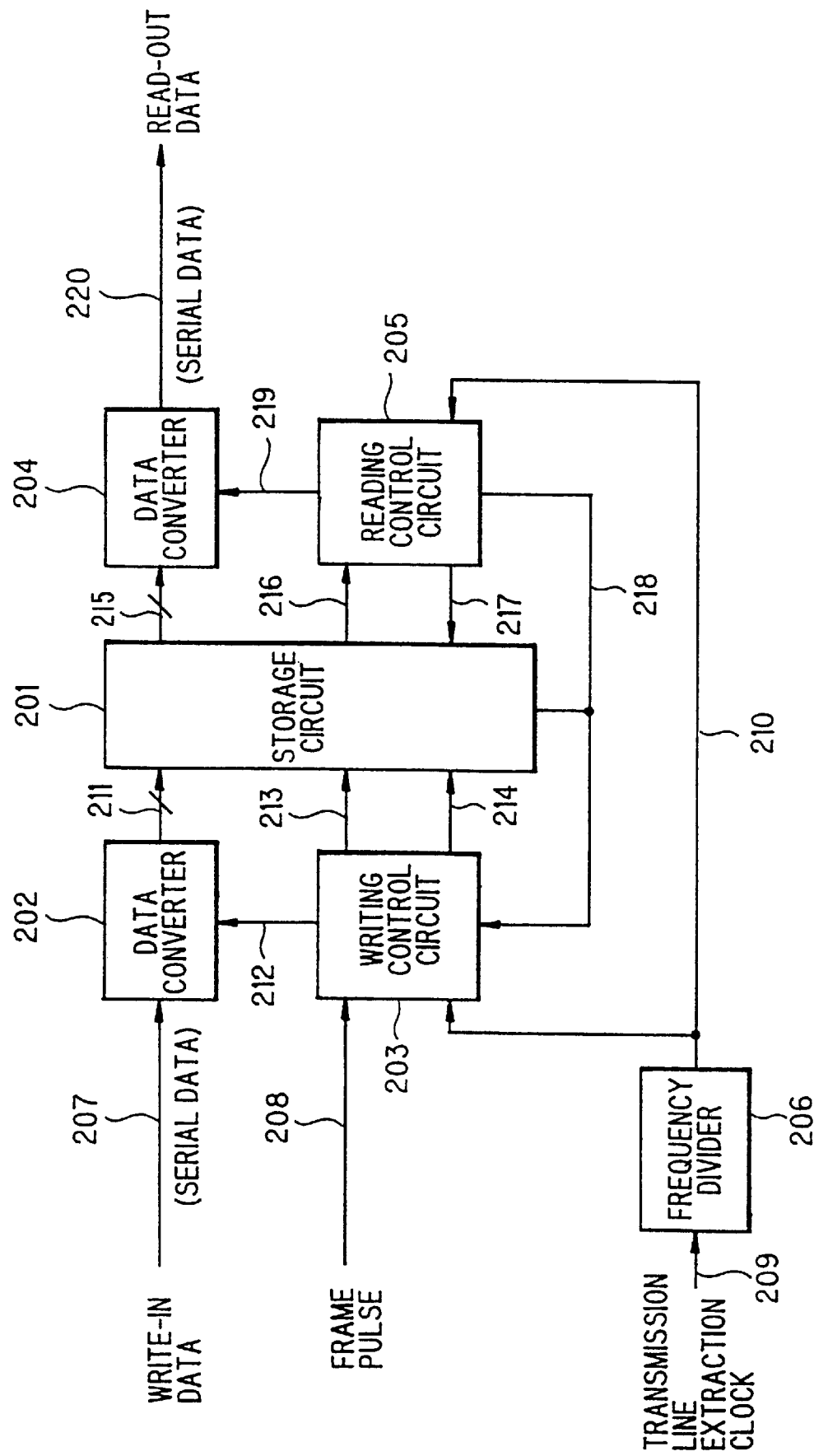
FIG. 2 is a block diagram showing a transmission frame format converter circuit in a preferred embodiment according to the invention.

As shown in FIG. 2, the transmission frame format converter circuit in the embodiment comprises a writing control circuit 203 on the write side of a storage circuit 201 and a reading control circuit 205 on the read side of the storage circuit 201.

Namely, provided on the write side are a frequency divider 206 to which an extraction clock 209 from a transmission line is input and from which a divided frequency clock 210 is output, a data converter(S/P converter) 202 which converts serial write-in data 207 to be input there into parallel data 211, and a writing control circuit 203 to which a frame pulse 208 is input, the divided frequency clock 210 output from the frequency divider 206 and a reset signal 218, which is explained later, output from the reading control circuit 205, and outputs a write clock 214 and a frame pulse 213 for indicating the head position of write data to the storage circuit 201 and outputs a divided frequency clock 212 necessary for the data converter(S/P) 202.

On the other hand, provided on the read side are a reading control circuit 205 to which a divided frequency clock 210 output from the frequency divider 206 and a frame pulse 216 for indicating the head position of data output from the storage circuit 201 are input and from which a read clock 217 is output to the storage circuit 201, and a data converter (P/S converter) 204 which converts parallel data to be read out from the storage circuit 201 into serial data 220. Also, a divided frequency clock 219 necessary for the data converter (P/S) 204 is output from the reading control circuit 205.

In this composition, the parallel data 211 output from the data converter(S/P) 202 and the frame pulse 213, which indicates the write data position, output from the writing control circuit 203 are written in the storage circuit 201 according to the write clock 214 output from the writing control circuit 203, and the parallel data 215 and frame pulse 216 are read out from the storage circuit 201 according to the read clock 217 output from the reading control circuit 205. Also, when the reset signal to be output from the reading control circuit 205 becomes active, the reset operations of the storage circuit 201 and writing control circuit 203 are conducted.

Figure 3:
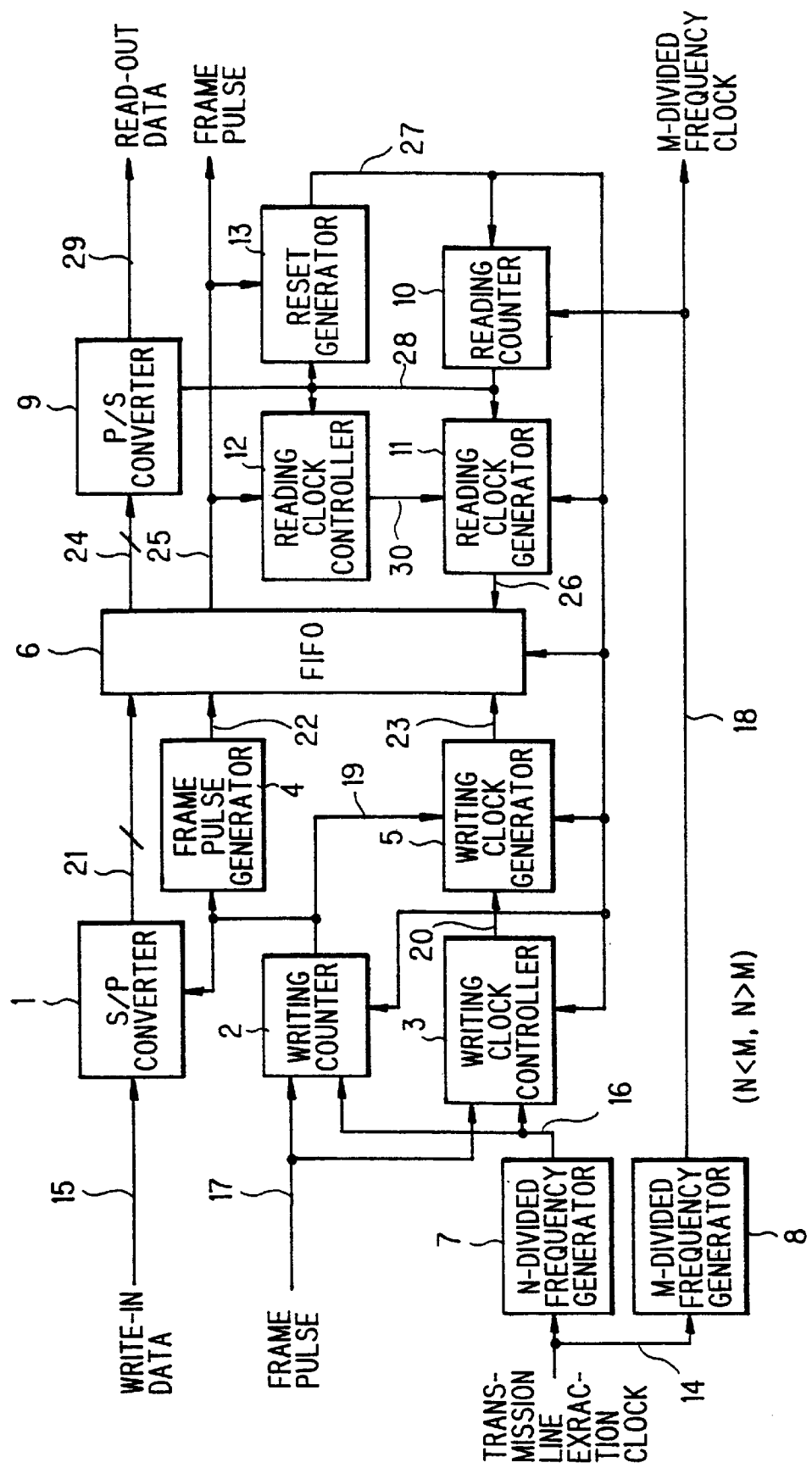
FIG. 3 is a block diagram showing the details of the transmission frame format converter circuit in FIG. 2.
Figure 4:
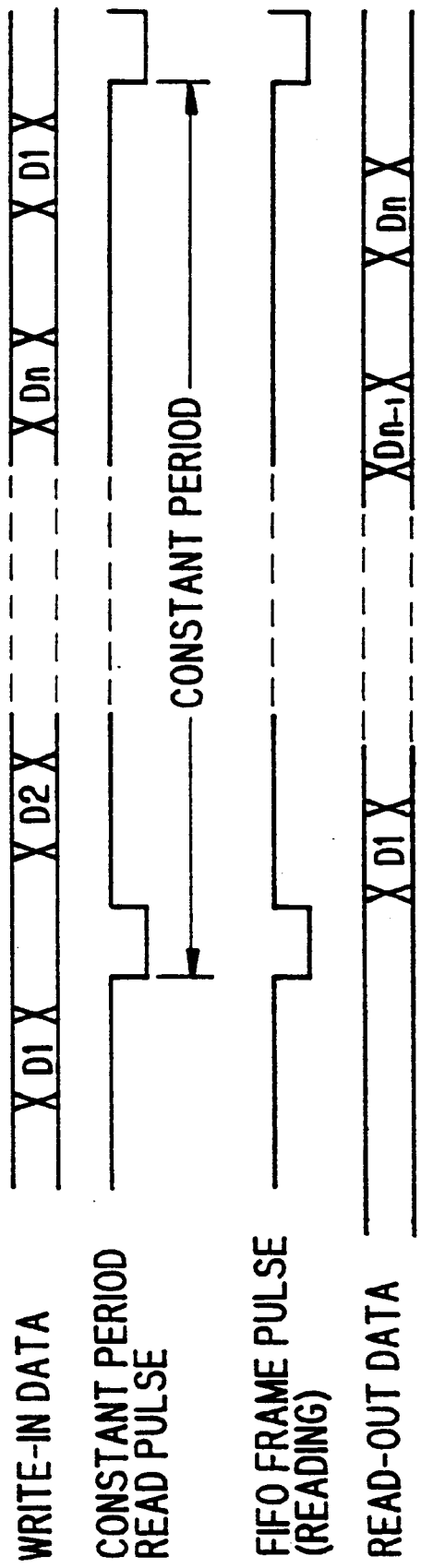
FIG. 4 is a timing chart showing a phase relation between data to be written in FIFO and data to be read out from FIFO.

Referring to FIGS. 3 and 4, the transmission frame format converter circuit in the embodiment will be further detailed.

With reference to FIG. 3, FIFO 6 corresponds to the storage circuit 201 in FIG. 2, a S/P converter 1 corresponds to the data converter 202 in FIG. 2, a P/S converter 9 corresponds to the data converter 204 in FIG. 2, and a N-divided frequency generator 7 and a M-divided frequency generator 8 correspond to the frequency divider 206 in FIG. 2. Also, the writing control circuit 203 in FIG. 2 is composed of a writing clock controller 3, a writing counter 2, a writing clock generator 5 and a frame pulse generator 4 in FIG. 3.

The reading control circuit 205 in FIG. 2 is composed of a reading counter 10, a reading clock controller 12, a reading clock generator 11 and a reset generator 13 in FIG. 3.

FIG. 4 is a timing chart showing the operation of the transmission frame format converter circuit in the embodiment.

First, on the write side, an extraction clock 14 from a transmission is input to the N-divided frequency generator 7, where a N-divided frequency clock 16 synchronizing with the clock 14 is generated and output. The writing counter 2, to which the N-divided frequency clock 16 and a frame pulse 17 are input, generates a divided frequency clock 19 which is the source of a write clock 23 for FIFO 6. Also, the writing clock controller 3 monitors the states of the N-divided frequency clock 16 and the frame pulse 17 to be input and outputs a write clock control signal 20. The write clock control signal 20 serves to mask the write clock 23 from the turning-on and resetting through the inputting of the first frame pulse 17. To the writing clock generator 5, the divided frequency clock 19 generated by the writing counter 2 and the write clock control signal 20 are input, and then the writing clock generator 5 generates the write clock 23 to FIFO 6. The frame pulse generator 4 generates a frame pulse 22 for indicating the head position of data written in FIFO 6 according to a divided frequency clock 19 output from the writing counter 2. The S/P converter 1 converts serial write-in data 15 into parallel data 21. The parallel data 21 and the frame pulse 22 are written in FIFO 6 according to the write clock 23.

On the other hand, on the read side, the clock 14 extracted from the transmission line is input to the M-divided frequency generator 8, which outputs a M-divided frequency clock 18 synchronized with the input clock 14. Here, the M-divided frequency clock 16 is not the same value as the N-divided frequency clock and satisfies the relation of M>N or M<N. The reading counter 10 to which the M-divided frequency clock 18 is input generates a divided frequency clock 28 which is the source of a read clock 26 for FIFO 6. The reading clock controller 12 monitors the divided frequency clock 28 output from the reading counter and the state of a frame pulse 25 read from FIFO 6, and outputs a clock control signal 30. The clock control signal 30 serves to mask the read clock 26 from the turning-on and resetting through the inputting of the first frame pulse 15. To the reading clock generator 11, the divided frequency clock 28 generated by the reading counter 10 and the read clock control signal 30 are input, and then the reading clock generator 11 generates the read clock 26 to FIFO 6. By the read clock 26, parallel data 24 and the frame pulse 25 are read out from FIFO 6.

The parallel data 24 are input to the P/S converter 9, converted into serial data 29, then output as read-out data.

Here, the frame pulse 25 read out from FIFO 6 is input to the reset generator 13. The reset generator 13, to which the divided frequency clock 28 output from the reading counter 10 is also input, compares the divided frequency clock 28 with the frame pulse 25 to judge the validity/invalidity of read-out data. When the frame pulse 25 read out from FIFO 6 is not active at the position of a constant period read pulse, data at the position is judged to be invalid. Then, a reset signal is output to reset the writing counter 2, writing clock controller 3 and writing clock generator 5 on the write side, the reading counter 10 and reading clock generator 11 on the reading side, and FIFO 6.

FIG. 4 is a timing chart showing phase relation between write-in data and read-out data. According to the constant period read pulse, write-in data written in FIFO 6 and a frame pulse to indicate the head position of valid data are read out. As the result of comparing the frame pulse read out from FIFO 6 with the constant period read pulse, when the frame pulse is not active, the resetting is conducted to initialize the control circuit including FIFO 6. Therefore, valid data to be read out are surely read after they are written in FIFO 6. Also, when data to be read out are judged to be invalid, they are not read out since the resetting is conducted. Thus, only valid data can be always read out.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A transmission frame format converter circuit with a first-in-first-out (FIFO) memory where the inputting and outputting of a data signal are conducted at different clock rates, comprising:

a write control means which writes write-in data and a frame pulse which is extracted from a transmission line and indicates a head position of said write-in data in said FIFO memory; and a read control means which judges that read-out data are valid only when said frame pulse to be read out from said FIFO memory is active and then reads out said read-out data from said FIFO memory, and which judges that said read-out data are invalid and then conducts the resetting of said write control means and said FIFO memory.

2. A transmission frame format converter circuit, according to claim 1, wherein:

said write control means comprises a writing clock generator which outputs a data write clock to said FIFO memory only when said frame pulse is active.

3. A transmission frame format converter circuit, according to claim 1, wherein:

said read control means comprises a reading clock generator which outputs a read clock only when a frame pulse read out from said FIFO memory is active.

4. A transmission frame format converter circuit of claim 1, wherein:

the write control means comprises a writing control circuit; and the read control means comprises a reading control circuit.

5. A method of transmitting data, comprising:

inputting write-in data to a storage circuit;

inputting a first frame pulse to a writing control circuit;

inputting a divided frequency clock signal to the writing control circuit and a reading control circuit;

outputting a second frame pulse from the writing control circuit to the storage circuit, the second frame pulse indicating a head position of the write-in data;

outputting a third frame pulse from the storage circuit to the reading control circuit, the third frame pulse indicating a head position of a read-out data;

comparing the third frame pulse to the divided frequency clock signal;

outputting the read-out data from the storage circuit when the third frame pulse is active at a position of a constant period pulse of the divided frequency clock signal; and resetting the writing control circuit and the storage circuit when the third frame pulse is not active at a position of a constant period pulse of the divided frequency clock signal.

6. A method of claim 5, wherein:

the step of inputting write-in data to the storage circuit comprises converting serial data to parallel data and inputting parallel data to a FIFO memory;

the step of inputting a first frame pulse to the writing control circuit comprises inputting a fourth frame pulse into a writing counter and outputting a fifth frame pulse from the writing counter to a frame pulse generator;

the step of inputting the divided frequency clock signal to the writing control circuit and the reading control circuit comprises inputting an N-divided frequency clock signal to the writing control circuit and inputting an M-divided frequency clock signal to the reading control circuit;

the step of outputting a second frame pulse comprises the substeps of:

inputting the N-divided frequency clock signal to the writing counter and a writing clock controller;

outputting a first divided frequency clock signal from the writing counter to a writing clock generator;

outputting a write clock control signal from the writing clock controller to the writing clock generator;

outputting a write clock signal from the writing clock generator to the FIFO memory; and outputting the second frame pulse from the frame pulse generator to the FIFO memory;

the step of outputting the third frame pulse from the storage circuit to the reading control circuit comprises outputting the third frame pulse from the FIFO memory to a reading clock controller and a reset generator;

the step of comparing the third frame pulse to the divided frequency clock signal comprises the substeps of:

inputting the M-divided frequency clock signal to a reading counter;

outputting a second divided frequency clock signal from the reading counter to a reading clock generator, the reading clock controller and the reset generator; and determining if the third frame pulse is active at a position of a constant period pulse of the second divided frequency clock signal;

the step of outputting read-out data from the storage circuit comprises the substeps of:

outputting a read clock control signal from the reading clock controller to the reading clock generator;

outputting a read clock signal from the reading clock generator to the FIFO memory; and outputting read-out data from the FIFO memory to a parallel to serial converter;

the step of resetting the writing control circuit and the storage circuit comprises outputting a reset signal from the reset generator to the reading clock generator, the FIFO memory, the writing clock generator and the writing clock controller.

7. A transmission frame format converter circuit, comprising:

a storage circuit electrically connected to a first data converter for receiving write-in data from the first data converter;

a writing control circuit comprising a first frame pulse input and electrically connected to the storage circuit for supplying to the storage circuit a write clock signal and a second frame pulse indicating a head position of the write-in data;

a reading control circuit electrically connected to the storage circuit for outputting to the storage circuit a read clock signal and for inputting from the storage circuit a third frame pulse indicating a head position of a read-out data to be output from the storage circuit;

a frequency divider for outputting a divided frequency clock signal to the writing control circuit and the reading control circuit; and a second data converter electrically connected to the storage circuit for inputting the read-out data from the storage circuit when the third frame pulse is active at a position of a constant period pulse of the divided frequency clock signal;

wherein the reading control circuit compares the third frame pulse with the divided frequency clock signal and outputs the read clock signal to the storage circuit when the third frame pulse is active at a position of a constant period pulse of the divided frequency clock signal; and wherein the reading control circuit resets the writing control circuit and the storage circuit if the third frame pulse is not active at a position of a constant period pulse of the divided frequency clock signal.

8. A transmission frame format converter circuit of claim 7, wherein:

the storage circuit comprises a FIFO memory;

the first data converter comprises a serial to parallel converter;

the writing control circuit comprises a writing clock controller, a writing clock generator, a writing counter and a frame pulse generator;

the reading control circuit comprises a reading clock controller, a reading clock generator, a reading counter and a reset generator;

the frequency divider comprises an N-divided frequency generator and an M-divided frequency generator; and the second data converter comprises a parallel to serial converter.

\* \* \* \* \*